Figure 1:
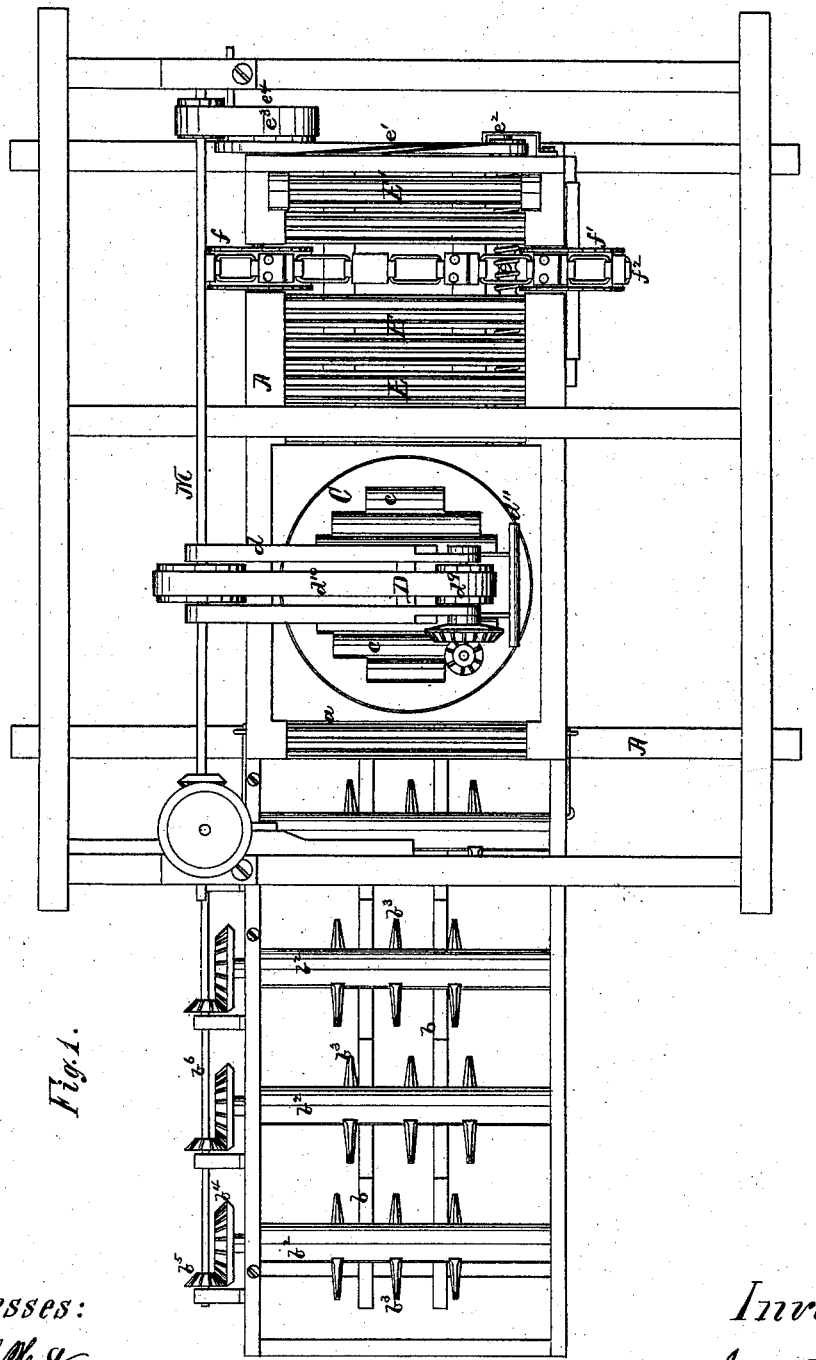

2 Sheets—Sheet 1.

I. BOONE.
HOG-DRESSING MACHINE.

No. 194,404. Patented Aug. 21, 1877.

Witnesses:
Theodore F. Master
B. S. Clark

Inventor:
Isaac Boone
Per Fitch & Fitch
Attys.

N. PETERS, PHOTO-LITHOGRAPHER, WASHINGTON, D. C.

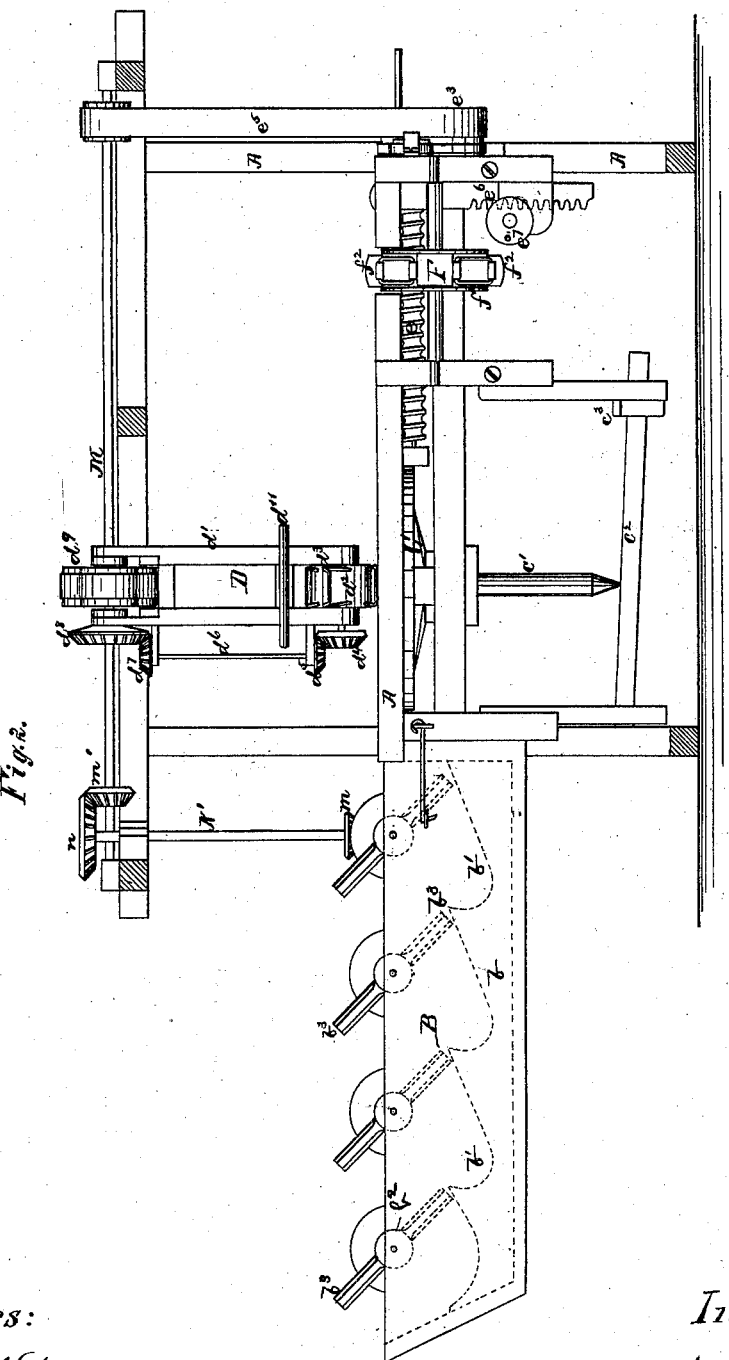

UNITED STATES PATENT OFFICE.

ISAAC BOONE, OF TROY, OHIO.

IMPROVEMENT IN HOG-DRESSING MACHINES.

Specification forming part of Letters Patent No. 194,404, dated August 21, 1877; application filed March 20, 1877.

*To all whom it may concern:*

Be it known that I, ISAAC BOONE, of Troy, in the county of Miami, State of Ohio, have invented an Improved Machine for Dressing or Cleaning Hogs, of which the following is a full, clear, and exact description, reference being had to the accompanying drawings, forming part of this specification.

My invention relates to a machine or apparatus for scalding and dressing hogs after the same have been slaughtered, and thus preparing the carcasses for market, whereby the operation of scalding and then removing the bristles from the hog are conveniently and speedily accomplished; and my invention consists in the devices and combinations of devices hereinafter particularly described and claimed.

Figure 1, Sheet 1, is a plan of an apparatus embodying my invention; and Fig. 2, Sheet 2, is a side elevation of the same.

A is the frame or table of my apparatus. Upon one end of this frame is mounted the scalding trough or vat B, as shown, the said vat being preferably detachable from the frame, so that it may be conveniently emptied and cleansed when required. This vat is made comparatively shallow, and upon its bottom are arranged upwardly-projecting ribs $b$, extending the length of the vat, and having their upper edges made with a succession of deep and wide curved notches or depressions, $b^1$, the notches of one rib being in line with the notches of the other ribs, respectively, as shown.

Extending across the vat transversely are arranged a series of shafts, $b^2$, having bearings in the sides of the vat. These shafts are arranged one over each of the depressions, $b^1$, and they are provided each with projecting arms $b^3$, arranged on opposite sides of the shafts, preferably in pairs, diametrically opposite to each other. These shafts are operated to revolve by means of bevel-gears $b^4$ and similar gears $b^5$ on shaft $b^6$, said shaft having motion communicated to it from the driving-shaft M through gears $m$ $m'$ and connecting-shaft N' with its gear $n$, as shown.

By means of this arrangement of parts, when the hog, after being killed, is placed in the scalding-vat B at the outer end thereof, it is carried along toward the table A by the arms $b^3$ of the shafts $b^2$ being passed over from one to another of the depressions in the ribs on the bottom of the vat, so that both sides of the hog are alternately entirely immersed in the vat twice, and the hog thus thoroughly scalded. The hog is passed by the last of these shafts $b^2$ onto the top of the table A, over and assisted by a toothed or corrugated roller, $a$, which revolves freely in bearings on the table at its end nearest the vat, as shown.

The hog is now cleaned or scraped as follows: In an opening in the top of the table A is arranged a circular disk or table, C, in the upper face of which are a series of free rollers, $c$, to facilitate the movement of the hog upon and across said disk, the said disk or table C being free to revolve in its opening on its pivoted standard $c^1$, which has a bearing on the lever $c^2$, that is operated to be raised or lowered by the foot-lever $c^3$, arranged conveniently beneath the table A, as shown. By this means the hog may be readily and easily turned on the table C to any desired position while being scraped, while by pressure upon the lever $c^3$ the hog may be forced upward into a closer contact with the scraper.

D is the scraping device, which is formed of the frame $d$, conveniently hinged upon the main shaft M, and arranged to extend horizontally therefrom over the revolving table C, and the frame $d^1$, which is hinged to the frame $d$ at the end thereof, and depends over the said table C, the said frame $d^1$ carrying at its lower end the scraper-wheel $d^2$, having upon its rim the scraping-knives $d^3$, and arranged to be rapidly revolved in bearings in said frame by gear $d^4$ engaging gear $d^5$ on shaft $d^6$, having bearings in hangers fixed on said frame, said shaft carrying at its upper end the gear $d^7$, which engages gear $d^8$ on shaft at the free end of frame $d$, which said shaft carries a pulley, $d^9$, moved by a belt, $d^{10}$, from a pulley on the shaft M, as shown. Upon the front of the frame $d^1$ is fixed a handle, $d^{11}$.

By means of this arrangement of parts it is evident that the scraping-knife, while being rapidly revolved, may, by the operator, be carried forward and backward, and raised up or lowered, as may be desired, and that by means of this free movement of the scraper, in connection with the free movement of the revolving table C, the hog may be quickly and easily cleaned of its bristles.

After being scraped the hog is delivered from the revolving table C onto the set of toothed or corrugated rollers E, which are set transversely in an opening in the top of the table A, and revolve in bearings therein, as shown, and are operated by a screw, $e$, working in bearings beneath the rollers, and engaging them on the under side of the table, said screw being revolved by a bolt, $e^1$, running over a pulley, $e^2$, on the end of the screw-shaft, to a pulley, $e^3$, on a shaft, $e^4$, having bearings beneath the table A, said pulley $e^3$ having motion communicated to it by a belt, $e^5$, from a pulley on the main shaft M, as shown. Upon the shaft $e^4$ is fixed a chain-pulley, $f$, and over this pulley and across the table A runs a chain-belt, F, to and over a chain-pulley, $f^1$, on the other side of said table, as shown. Upon this chain-belt F are fixed projecting knives $f^2$ at proper or desired distances from each other. The pulley $f$ receives motion from the pulley $e^3$ on the end of its shaft, and the chain-belt carrying the knives is thus caused to travel rapidly across the table A. By this means, when the hog leaves table C, after being subjected to the scraping device D, it is carried by the rollers E to and upon the belt F. The knives $f^2$, moving rapidly across and along the hog by the motion of the belt N, act to scrape off and remove any remaining bristles, in which operation they may, if desired, be aided by a knife in the hand of the operator. The scraping of the hog is thus finished by the knives $f^2$. To prevent the hog from being caught and carried prematurely from the belt F by the rollers E, situated beyond said belt, the roller E′ is mounted in bearings in the racks $e^6$, which are arranged to slide vertically in ways in the frame A, and which may be varied so as to carry the said roller E′ out of engagement with the screw $e$, and above the face of the table A, by means of crank-pinions $e^7$ fixed on a transverse shaft and engaging said racks, as shown. By this means, when the roller E is raised, it acts as a guard to hold the hog over the belt F, and when it is lowered it engages the screw, and the hog is carried by it away from the belt, and may then be packed for transportation.

Having thus described my invention, what I claim as new, and desire to secure by Letters Patent, is—

1. The scalding-vat B, having longitudinal notched ribs $b$ projecting upward from its bottom, along which the hogs are carried, while being scalded, by arms $b^3$ fixed on transverse rotating shafts $b^2$, as described.

2. The platform A, provided with a vertically-adjustable revolvable table, C, the face of which consists of a series of free rollers, $c$, together with a rotating scraping device, D, adapted to have a free vertical and horizontal motion with its carriage; also, a series of revolving, corrugated carrying-rollers, E, set in the extension of said platform, and a chain-belt scraper, $f^2$, across said platform, all arranged to operate as and for the purpose specified.

3. In the scalding-vat B, the longitudinal, upwardly-projecting ribs $b$, having upon their upper edges the deep and wide curved notches or depressions $b^1$ and the transverse rotating shafts $b^2$, arranged respectively over each of the said depressions, and having the projecting arms $b^3$, all arranged to operate as and for the purpose specified.

4. The rotating scraper-wheel $d^2$, carrying the knives $d^3$, and adapted to have free vertical and horizontal movements with its carriage on the table C, in the face of which are the rollers $c$, and which has pivotal standard $c^1$ bearing in lever $c^2$ in frame and platform A, all arranged to operate as and for the purpose specified.

5. The scraping device D, composed of the hinged frame $d$, extending horizontally over table C, and carrying pulley $d^9$, the hinged frame $d^1$ depending over said table and carrying scraper-wheel $d^2$ with its knives $d^3$, as arranged and operated by suitable gears, as and for the purpose specified.

6. The combination, with the platform A, of the corrugated rollers E, their operating-screw $e$ revolved by pulley $e^2$, the chain-belt F carrying scrapers $f^2$, together with roller E′ mounted in racks $e^6$, provided with crank-pinions $e^7$, arranged to operate as and for the purpose specified.

ISAAC BOONE.

Witnesses:
CHAUNCEY F. GROSVENOR,
CALVIN D. WRIGHT.